July 25, 1933.  H. T. THOMAS ET AL  1,920,038
TRANSMISSION CONTROL MECHANISM
Filed March 30, 1932  2 Sheets-Sheet 2
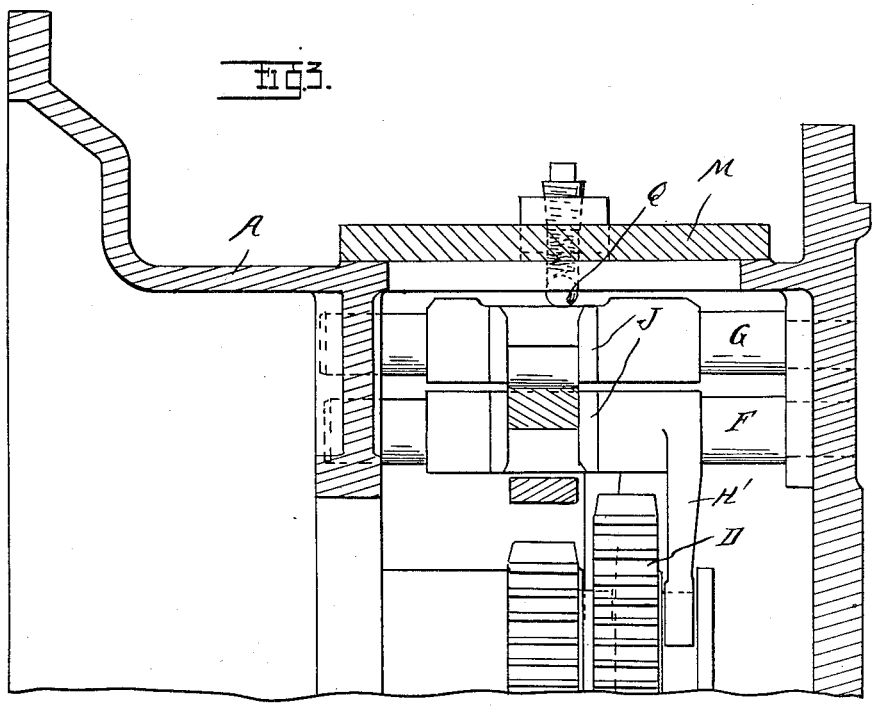
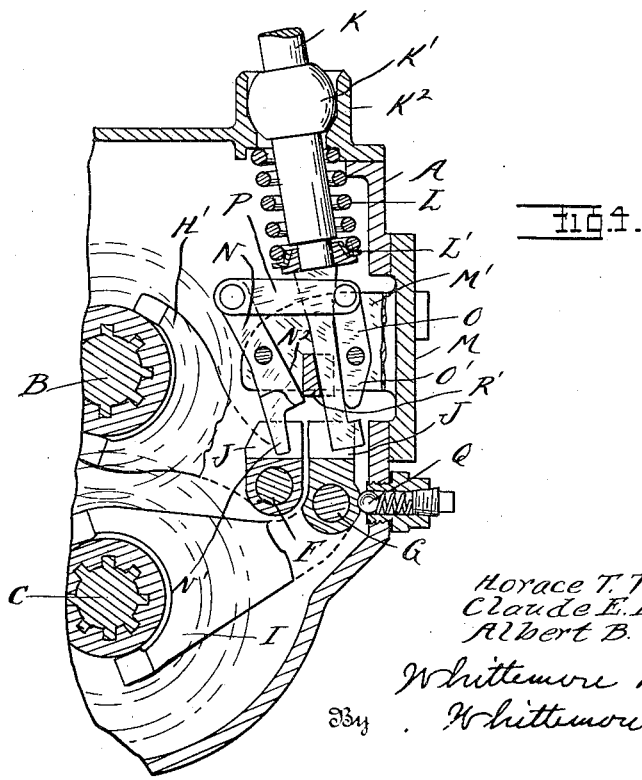
Inventors
Horace T. Thomas
Claude E. Furgason
Albert B. Hay
By Whittemore Hulbert
Whittemore & Belknap
Attorneys Patented July 25, 1933

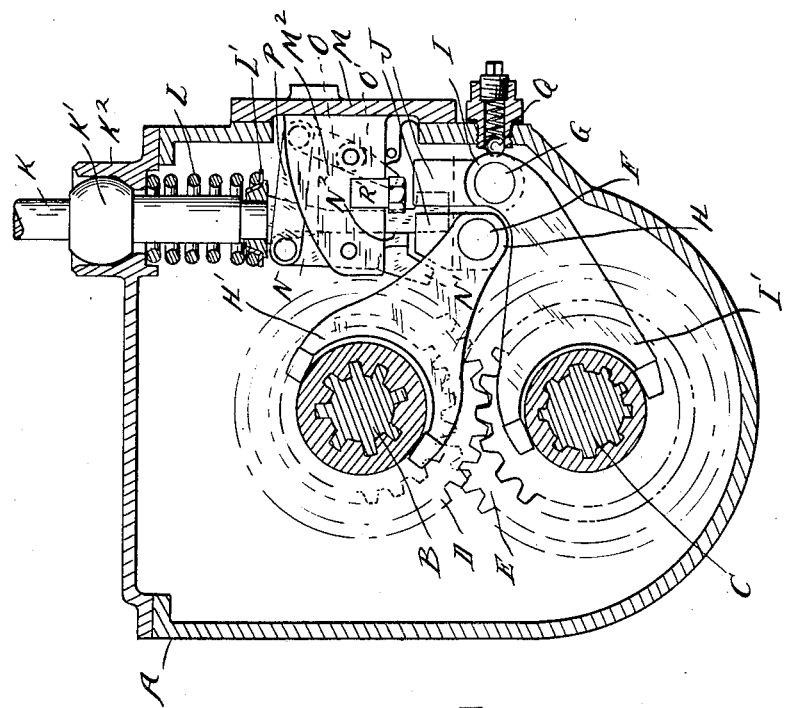
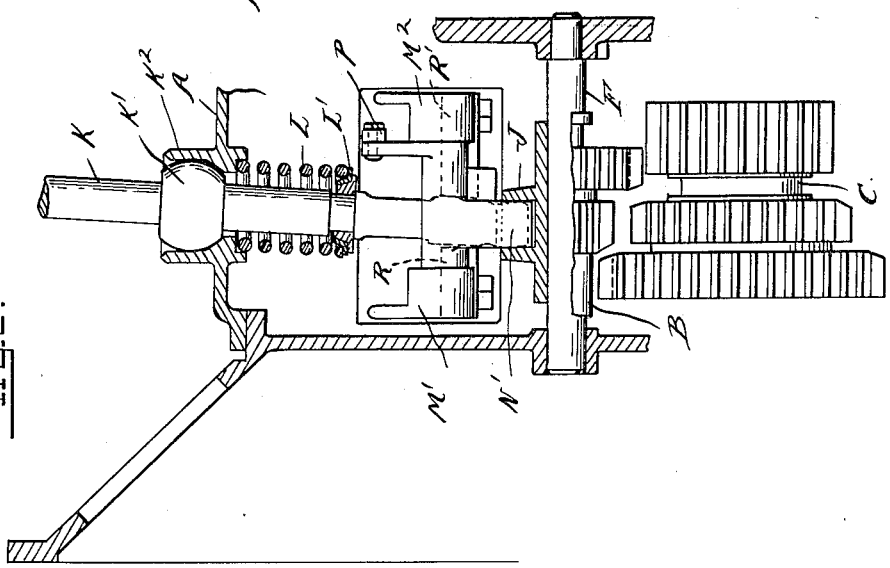

1,920,038

UNITED STATES PATENT OFFICE

HORACE T. THOMAS, CLAUDE E. FURGASON, AND ALBERT B. HAYS, OF LANSING, MICHIGAN, ASSIGNORS TO REO MOTOR CAR COMPANY, OF LANSING, MICHIGAN, A CORPORATION OF MICHIGAN

TRANSMISSION CONTROL MECHANISM

Application filed March 30, 1932. Serial No. 602,089.

The invention relates to transmission control mechanisms and more particularly to control mechanisms for that type of transmission in which a plurality of gear shifters are operated both simultaneously and singly. The usual type of transmission having three forward speeds and reverse is provided with a pair of shifters which are alternatively operated and consequently the control lever is engaged with only one shifter at a time. However, with other types of transmission it is necessary to move both shifters simultaneously in the same direction and alternatively to lock one of said shifters and to actuate the other. It is the object of the invention to obtain a simple construction of control having transmissions of the latter type and to this end the invention consists in the construction as hereinafter set forth.

In the drawings:

Figure 1 is a cross section through the housing of a transmission mechanism showing a pair of shiftable gears and the control mechanism therefor;

Figure 2 is a longitudinal section;

Figure 3 is a sectional plan view;

Figure 4 is a view similar to Figure 1 showing the different positions of adjustment of the parts.

As illustrated, A is the housing for the transmission mechanism, B is the main shaft therefor, C is a counter shaft and D and E are shiftable gears respectively concentric with the main shaft and counter shaft. As the specific construction of the transmission is not a part of the present invention, it will be unnecessary to describe it further than to state that for effecting the various changes the gears D and E are in one change moved simultaneously and for another change the gear D is held in fixed position and the gear E is shifted.

F and G are parallel rods arranged at one side of the gear wheels D and E and H and I are shifters slidably mounted respectively on said rods. The shifter H has a forked arm H' for engaging the gear wheel D and the shifter I has a forked arm I' for engaging the gear wheel E. Each of these shifters is also provided with an upwardly extending pair of spaced flanges J which in neutral position of the transmission extends in transverse alignment with each other.

K is the control lever universally pivoted on the ball K' engaging a bearing K² on the housing A. The lower end of this lever extends between the flanges J and in neutral position engages said flanges on both the shifters H and I as indicated in Figure 1, being yieldably held in such position by the tension of a spring L sleeved upon the lever, one end engaging the bearing K² and the other a collar L' on the lever. Thus in this position of parts the lever K if actuated in a plane parallel to the rods F and G will simultaneously move both of the shifters H and I.

For other speed changes, the shifter I alone must be actuated and the shifter H locked from movement. This is accomplished by mechanism of the following construction: M is a removable cover for an opening in the side of the housing A. M' and M² are lugs projecting inward from this cover between which are arranged members N and O pivoted to said lugs and on opposite sides of the lever K. The member O is normally inclined in position as indicated in Figure 1 and has the portion O' which extends below the pivot in the path of the lever K when the latter is moved from engagement with both of the shifters H and I into a position where it engages only the shifter I. The upper ends of the members O and N are connected by a link P and the lower end of the member N has a portion N' normally clearing the flanges J of the shifter H. When, however, the lever K is moved to engage only the shifter I, it will contact with the member O, rocking the same and through the link P rocking the member N so as to engage the portion N' thereof between the flanges J of the shifter H. This will effectually lock said shifters from any movement as long as the lever K is engaging only the shifter I. However, upon the return movement of the lever K into the position shown in Figure 1, it will bear against a portion N² and move the member N to clear the flanges J of the shifter H.

In operation, the lever K can be rocked transversely in the plane of Figure 1 to selectively engage either both of the shifters H and I or to engage only the shifter I. In each of these positions the lever may be rocked in the plane of Figure 2 and in the one position will simultaneously move both shifters H and I and the gears D and E carried thereby while in the other position the shifter I alone is actuated and the shifter H is locked by the engagement of the portion N' of the member N between the flanges J. The shifter I is yieldably held in different shifted position by a suitable ball latch Q.

The lever K is held from transverse rocking during the operation of the shifters by guides R and R'. These guides are mounted in the lugs M', M² and extend oppositely therefrom (as shown in dotted lines in Figure 2) with the space between their inner ends for the passage of the lever K when in neutral position.

What we claim as our invention is:

1. The combination with a variable speed transmission mechanism, of control mechanism therefor comprising a pair of parallelly arranged gear shifters having normally aligned transverse channels therein, a universally rockable lever having its lower end engaging said channels and normally bridging therebetween for simultaneous operation of both shifters, a locking dog pivotally mounted adjacent to one of said shifters and means operated by the transverse movement of said lever disengaging the same from one of said shifters for rocking said locking dog into engagement with the said shifter.

2. The combination with a variable speed transmission mechanism, of control mechanism therefor comprising a pair of parallelly arranged gear shifters having normally aligned transverse channels therein, a universally pivoted lever having its lower end engaging said channels and normally bridging therebetween for simultaneous operation of both shifters, a locking dog pivotally mounted adjacent to one of said shifters, a lever having one end extending into the path of said universally pivoted lever to be actuated thereby during the transverse shifting thereof out of engagement with both of said shifters into engagement with one thereof, and a link between said lever and said dog for actuating the latter into the channel of the disengaged shifter.

3. The combination with a variable speed transmission mechanism, of control mechanism therefor comprising a pair of parallelly arranged gear shifters having normally aligned transverse channels therein, a housing for said transmission also enclosing said shifters and having an opening at one side thereof, a cap for closing said opening, a universally pivoted lever mounted on said housing and having its lower end normally in engagement with the transverse channels of said shifters to bridge between the same for simultaneous operation of both shifters, a cover for said opening in said housing, a lug projecting inward from said cover, a dog pivotally mounted on said lug adjacent to one of said shifters and in alignment with the transverse channel therein, a lever pivoted on said lug having one end extending into the path of said universally pivoted lever to be operated by the latter during its movement out of engagement with one shifter and into engagement with another, and a link between the lever pivoted on said lug and said dog for operating the latter to lock the shifter from which the universally pivoted lever is disengaged.

HORACE T. THOMAS.
CLAUDE E. FURGASON.
ALBERT B. HAYS.